(12) United States Patent
Spencer (10) Patent No.: US 11,307,768 B2
(45) Date of Patent: Apr. 19, 2022

(54) NAMESPACE AUTO-ROUTING DATA STORAGE SYSTEM

(71) Applicant: Seagate Technology LLC, Fremont, CA (US)

(72) Inventor: Thomas V. Spencer, Fort Collins, CO (US)

(73) Assignee: SEAGATE TECHNOLOGY LLC, Fremont, MN (US)

( * ) Notice: Subject to any disclaimer, the term of this patent is extended or adjusted under 35 U.S.C. 154(b) by 0 days.

(21) Appl. No.: 15/929,856

(22) Filed: May 26, 2020

(65) Prior Publication Data

US 2020/0387307 A1 Dec. 10, 2020

Related U.S. Application Data

(60) Provisional application No. 62/858,390, filed on Jun. 7, 2019.

(51) Int. Cl.
*G06F 3/06* (2006.01)

(52) U.S. Cl.
CPC .......... *G06F 3/0607* (2013.01); *G06F 3/0619* (2013.01); *G06F 3/0653* (2013.01); *G06F 3/0683* (2013.01)

(58) Field of Classification Search
CPC ...... G06F 3/0607; G06F 3/061; G06F 3/0619; G06F 3/0635; G06F 3/0653; G06F 3/067; G06F 3/0683
See application file for complete search history.

(56) References Cited

U.S. PATENT DOCUMENTS

| | | | |
|---|---|---|---|
| 7,697,332 B2 | 4/2010 | Qu et al. | |
| 7,769,781 B1 | 8/2010 | Huntley | |
| 7,978,516 B2 | 7/2011 | Olbrich et al. | |
| 8,069,099 B2 | 11/2011 | Chan et al. | |
| 9,703,702 B2 | 7/2017 | Tam | |
| 10,440,141 B2 | 10/2019 | Pitts | |
| 10,572,413 B2 | 2/2020 | Park et al. | |
| 2016/0170903 A1* | 6/2016 | Kanno | G06F 12/0246 711/103 |

* cited by examiner

*Primary Examiner* — Yong J Choe
(74) *Attorney, Agent, or Firm* — Hall Estill Law Firm (57) ABSTRACT

A data storage system can employ namespace auto-routing by connecting a host to a data storage device via a system module. A data access request may be generated with the host and a namespace is then assigned to the data access request with a firmware upstream of the system module. An optimal physical data address in the data storage device can be assigned with the system module prior to writing the data associated with the data access request to the assigned physical data address of the assigned namespace.

20 Claims, 5 Drawing Sheets

NAMESPACE AUTO-ROUTING DATA STORAGE SYSTEM

RELATED APPLICATION

The present application claims priority to U.S. Provisional Patent Application No. 62/858,390 filed Jun. 7, 2019, the contents of which is hereby incorporated by reference.

SUMMARY

A data storage system, in accordance with some embodiments, has a host connected to a data storage device via a system module. A data access request is generated with the host and a namespace is then assigned to the data access request with firmware upstream of the system module. An optimal physical data address of the assigned namespace in the data storage device is assigned with the system module prior to writing the data associated with the data access request to the assigned physical data address of the assigned namespace.

Other embodiments of a data storage system connect a host to a data storage device via a system module where a data write request is generated with the host. A namespace is assigned to the data write request with a firmware upstream of the system module prior to the availability of physical data addresses of the assigned namespace in the data storage device is determined and an optimal physical data address in the assigned namespace in the data storage device is assigned with the system module. Data associated with the data access request is then written to the assigned physical data address of the assigned namespace.

In various embodiments, a host is connected to a data storage device via a system module that is configured to assign an optimal physical data address in the data storage device corresponding to a namespace assigned to a data access request by firmware upstream of the system module.

DETAILED DESCRIPTION

Assorted embodiments disclosed herein are generally directed to data access command optimization via namespace auto-routing.

In data storage systems employing a NVMe (Non-Volatile Memory Express) standard, multiple queues can be utilized for data access requests with each request corresponding to an amount of data transferred between a host and a memory location. If a simple arbitration scheme is used to select which queued requests to execute, such as round robin or first in first out (FIFO), queues populated with requests having greater volumes of data will utilize more common system resources than queues populated with requests having smaller volumes of data. Such inequity amongst data access request queues can be problematic for consistent data access performance.

In some data storage systems, input/output (I/O) determinism can be employed. A goal of I/O determinism is to minimize the impact of operations between data sets of memory, particularly NVMe data sets. Although I/O determinism can provide control over the physical separation of storage media to avoid interactions, there are other shared, or otherwise common, controller resources that can also be optimized to provide additional isolation of command execution between data sets. However, the utilization of controller resources does not necessarily optimize data access consistency and can favor peak data access performance at the expense of queued data access request execution consistency.

The distribution of data access requests in a data storage system can engage assorted locations of one or more memories. The presence of multiple controllers to direct such data access requests can increase request execution times in some instances, but can degrade system performance in other instances where redundancies and/or conflicts are experienced between separate controllers. Such degraded system performance can be particularly present in I/O determinism where data access command execution consistency is given premium importance.

Accordingly, various embodiments are directed to setting data namespace assignments automatically to allow data access commands to be automatically routed without a controller being directly involved. The ability to replace data storage controller operation with upstream firmware allows namespace assignment to be completed efficiently at a host level prior to reaching downstream data storage controller (s). Such namespace assignments that provide auto-routing of commands to the appropriate downstream queue/device/namespace without controller involvement frees the controller(s) of the data storage system to actively optimize system operation, such as I/O determinism.

In general, solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into die sets, which may correspond with the NVMe standard. This standard enables multiple owners (users) to access and control separate portions of a given SSD (or other memory device).

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs have a top-level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate NVMe sets, or namespaces. This allows the various NVMe sets to be concurrently serviced for different owners (users).

SSDs have a limited number of hold up energy after power loss that is tied to the number of capacitors. More capacitors are needed in order to keep a drive alive longer after power loss, minimizing the number of capacitors can increase system performance. On the other hand, limiting the amount of host and metadata that can be written after power loss can restrict the drive performance, since work will need to denied until previously open work has completed. In contrast, the more metadata you can write on power loss improves the time to ready when the drive comes back up again, and less work needs to be done in order to fully reload the drive context.

Figure 1:
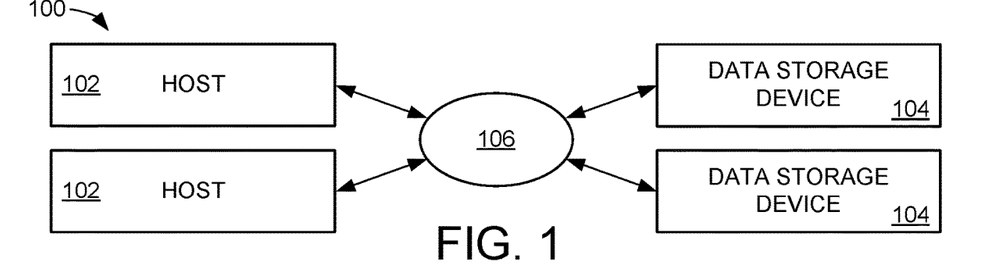
FIG. 1 provides a block representation of a data storage system in which various embodiments can be practiced.

These and other features may be practiced in a variety of differently configured data storage systems, but various embodiments conduct data access queue arbitration optimization in the example data storage system 100 shown as a simplified block representation in FIG. 1. The system 100 has a plurality of different hosts 102 connected to a plurality of different data storage devices 104 via a network 106. The assorted hosts 102 can be any remote computing device, such as a computer, server, circuit, node, or processor, capable of generating or transferring data to be stored in one or more data storage devices 104.

The respective data storage devices 104 may have similar, or dissimilar, configurations, and physical locations, that provide a non-volatile data storage capacity to the respective hosts 102 connected to the network 106. The network 106 can be any wired and/or wireless connection between hosts 102 and storage destinations. In some embodiments, the network 106 comprises circuitry allowing for the intelligent organization and distribution of data from one or more hosts 102 to one or more destination data storage devices 104.

Figure 2:
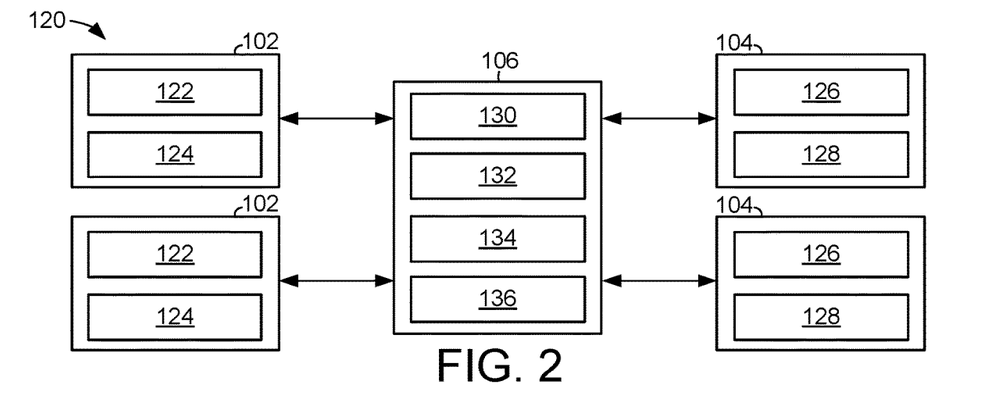
FIG. 2 displays portions of an example data storage system arranged in accordance with some embodiments.

FIG. 2 illustrates a block representation of an example data storage system 120 where the respective hosts 102 each have a local controller 122 and memory 124 that enables data to be transferred to the network 106. It is contemplated that the hosts 102 designate a data storage destination, such as a logical and/or physical address in the local memory 126 of one or more data storage devices 104, but such address assignment is not required. It is also contemplated that a local device controller 128 can participate in organizing and storing data in memory 126 that originated in a host 102.

While the network 106 may simply transfer data, and other data information, between a host 102 and at least one data storage device 104, various embodiments configure the network 106 with at least one network controller 130 that can utilize one or more network buffers 132 to temporarily, or permanently, store data. The network controller 130 may also utilize network arbitration circuitry 134 to organize and/or deploy data requests, and associated data, to/from the various data storage devices 104. A prediction circuit 136 may be selectively utilized by the network controller 130 to analyze data requests allocation, data request execution, data queue performance, data storage device performance, and other data storage system operational parameters to compute future data access request, and data access execution, metrics that can aid in the organization and deployment to provide heightened I/O determinism data access consistency to one or more hosts 102.

Figure 3:
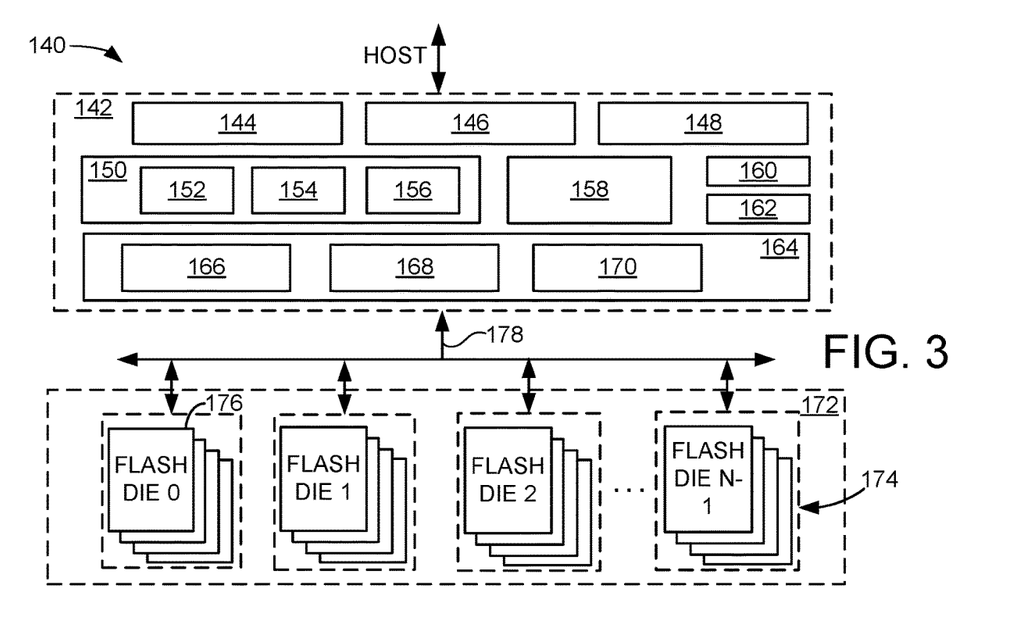
FIG. 3 shows aspects of an example data storage system configured in accordance with assorted embodiments.

FIG. 3 displays an example data storage device 140 generally corresponding to the device 104 in FIGS. 1 & 2. The device 140 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe standard, which enables different users to allocate die sets for use in the storage of data Each die set may form a portion of a Namespace that may span multiple SSD; or be contained within a single SSD. The SSD 140 can comprise a controller circuit 142 with a front-end controller 144, a core controller 146 and a back-end controller 148. The front-end controller 144 performs host functions, the back-end controller 148 directs data transfers with the memory module 144 and the core controller 146 provides top level control for the device.

Each controller 144, 146 and 148 has a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 150 represents various forms of volatile and/or non-volatile memory (e.g., SRAM, DDR DRAM, flash, etc.) utilized as local memory by the controller 142. Various data structures and data sets may be stored by the memory including one or more map structures 152, one or more caches 154 for map data and other control information, and one or more data buffers 156 for the temporary storage of host (user) data during data transfers.

A non-processor based hardware assist circuit 158 may enable the offloading of certain memory management tasks by one or more of the controllers as required. The hardware circuit 158 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 142, such as a data compression block 160 and an encryption block 162. The data compression block 160 applies lossless data compression to input data sets during write operations, and subsequently provides data de-compression during read operations. The encryption block 162 provides any number of cryptographic functions to input data including encryption, hashes, decompression, etc.

A device management module (DMM) 164 supports back end processing operations and may include an outer code engine circuit 166 to generate outer code, a device I/F logic circuit 168 and a low density parity check (LDPC) circuit 170 configured to generate LDPC codes as part of the error detection and correction strategy used to protect the data stored by the by the SSD 140.

A memory module 172 corresponds to the memory 126 in FIG. 2 and includes a non-volatile memory (NVM) in the form of a flash memory 174 distributed across a plural number N of flash memory dies 176. Rudimentary flash memory control electronics may be provisioned on each die 176 to facilitate parallel data transfer operations via one or more channels (lanes) 178.

Figure 4:
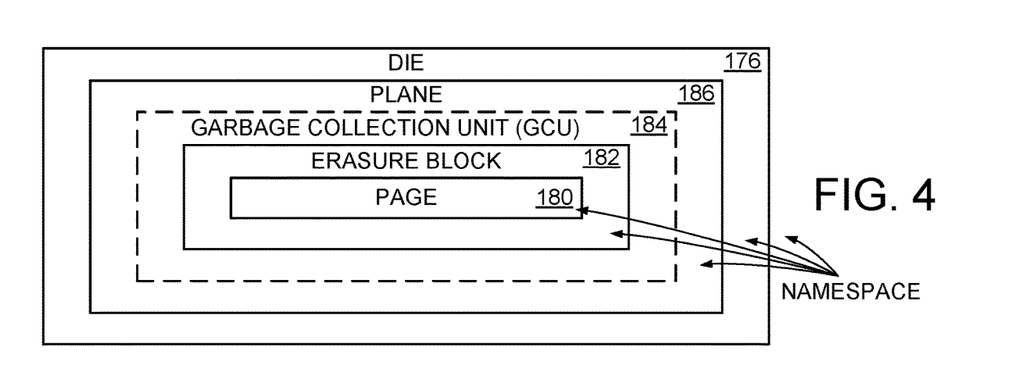
FIG. 4 is a block representation of an example memory capable of being used in the data storage system of FIGS. 1-3.

FIG. 4 shows an arrangement of a flash memory die 176 that can be used in the flash memory 174 of FIG. 3 in some embodiments. Other configurations can be used. The smallest unit of memory that can be accessed at a time is referred to as a page 180. A page may be formed using a number of flash memory cells that share a common word line. The storage size of a page can vary; current generation flash memory pages can store, in some cases, 16 KB (16,384 bytes) of user data.

The memory cells associated with a number of pages are integrated into an erasure block 182, which represents the smallest grouping of memory cells that can be concurrently erased in a NAND flash memory. A number of erasure blocks 182 are turn incorporated into a garbage collection unit (GCU) 184, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 176 may include a plurality of planes 186. Examples include two planes per die, four planes per die, etc. although other arrangements can be used. Generally, a plane is a subdivision of the die 176 arranged with separate read/write/erase circuitry such that a given type of access operation (such as a write operation, etc.) can be carried out simultaneously by each of the planes to a common page address within the respective planes.

As defined by one or more controllers of a data storage system, some, or all, of a memory can be declared a namespace. Such a namespace conveys operational characteristics, such as names of data types, data functions, and data variables. A namespace can organize data, and data access operations, into logical groups that optimize data access, particularly large volumes of data accesses where name collisions and other faults can readily occur. It is noted that a memory can be segmented into multiple different namespaces that concurrently operate and can be independently altered at will.

Figure 5:
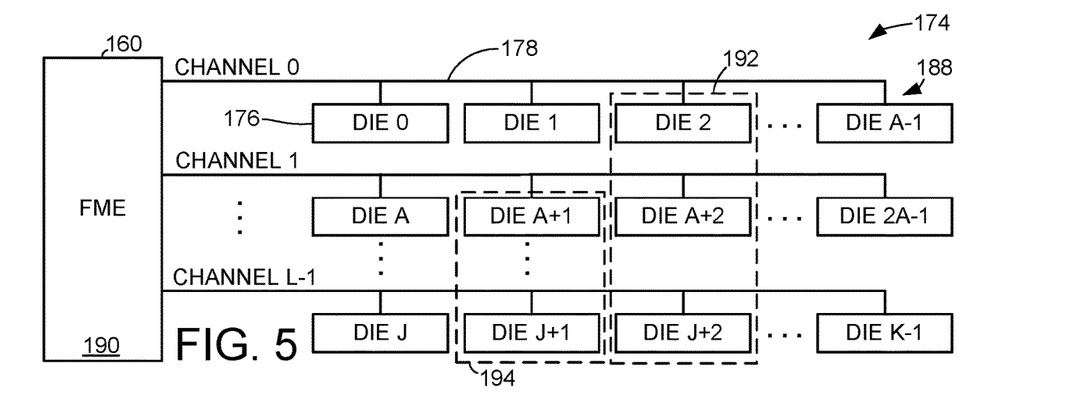
FIG. 5 illustrates portions of an example data storage system that can be utilized in the data storage system of FIGS. 1-3 in accordance with various embodiments.

FIG. 5 shows further aspects of the flash memory 174 in some embodiments. A total number K dies 176 are provided and arranged into physical die groups 188. Each die group 188 is connected to a separate channel 178 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 190 of the flash memory module 174 controls each of the channels 168 to transfer data to and from the dies 176.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 176 will be allocated for incorporation into a given die set.

A first example die set is denoted at 192 in FIG. 5. This first set 192 uses a single die 176 from each of the different channels 178. This arrangement provides fast performance during the servicing of data transfer commands for the set since all eight channels 178 are used to transfer the associated data. A limitation with this approach is that if the set 192 is being serviced, no other die sets can be serviced during that time interval. While the set 192 only uses a single die from each channel, the set could also be configured to use multiple dies from each channel, such as 16 dies/channel, 32 dies/channel, etc.

A second example die set is denoted at 194 in FIG. 5. This set uses dies 176 from less than all of the available channels 178. This arrangement provides relatively slower overall performance during data transfers as compared to the set 192, since for a given size of data transfer, the data will be transferred using fewer channels. However, this arrangement advantageously allows the SSD to service multiple die sets at the same time, provided the sets do not share the same (e.g., an overlapping) channel 178.

It is noted that data may be stored to the flash memory module 174 as map units (MUs) that represent fixed sized blocks of data that are made up of one or more user logical block address units (LBAs) supplied by a host. Without limitation, LBAs may have a first nominal size, such as 512 bytes (B), 1024 B (1 KB), etc., and the MUs may have a second nominal size, such as 4096 B (4 KB), etc. The application of data compression may cause each MU to have a smaller size in terms of actual bits written to the flash memory 174.

MUs can be arranged into the aforementioned pages 180, as shown in FIG. 4, which are written to the memory 174. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks to enable the SSD 140 to locate the physical location of existing data. For example, during the servicing of a read command it is generally necessary to locate the physical address within the flash memory 176 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
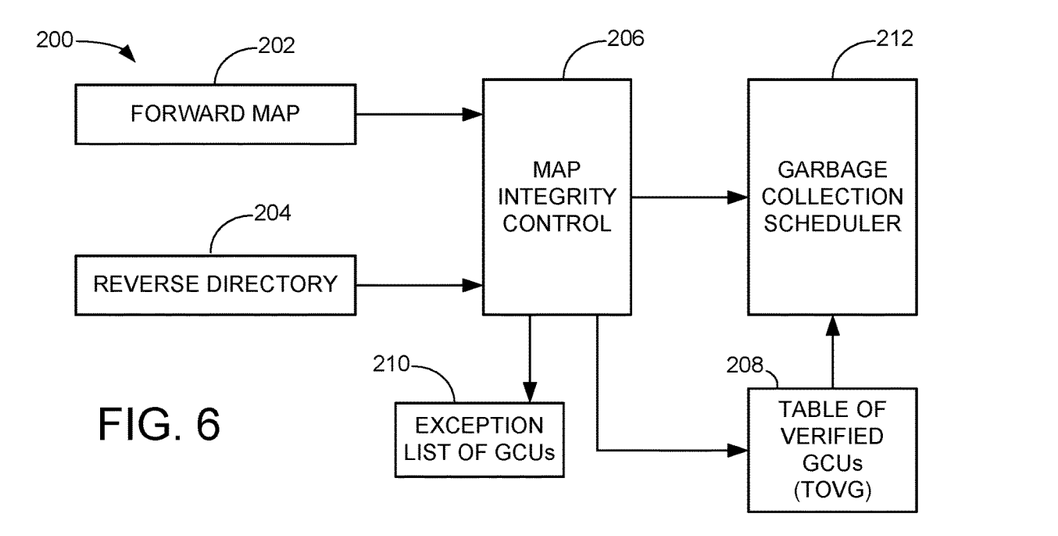
FIG. 6 depicts a functional block diagram for a data storage system operated in accordance with some embodiments.

FIG. 6 shows a functional block diagram for a data storage device management circuit 200 that can be utilized in accordance with some embodiments. The circuit 200 may form a portion of the controller 142 and may be realized using hardware circuitry and/or one or more programmable processor circuits with associated firmware in memory. The circuit 200 includes the use of a forward map 202 and a reverse directory 204. As noted above, the forward map and reverse directory are metadata data structures that describe the locations of the data blocks in the flash memory 172. During the servicing of host data transfer operations, as well as other operations, the respective portions of these data structures are located in the flash memory or other non-volatile memory location and copied to local memory 126 (see e.g., FIG. 2).

The forward map 202 provides a flash transition layer (FTL) to generally provide a correlation between the logical addresses of various blocks and the physical addresses at which the various blocks are stored (e.g., die set, die, plane, GCU, EB, page, bit offset, etc.). The contents of the forward map 202 may be stored in specially configured and designated GCUs in each die set.

The reverse directory 204 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 200 further includes a map integrity control circuit 206. That generally operates at selected times to recall and compare, for a given GCU, the forward map data and the reverse directory data. This evaluation step includes processing to determine if both metadata structures indicate the same number and identify of the valid data blocks in the GCU. If the respective forward map and reverse directory match, the GCU is added to a list of verified GCUs in a data structure referred to as a table of verified GCUs, or TOVG 208. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 206 find a mismatch between the forward map 202 and the reverse directory 204 for a given GCU, the control circuit 206 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 202 indicates that there should be some number X valid blocks in the selected GCU, such as 12 valid blocks, but the reverse directory 204 indicates that there are only Y valid blocks, such as 11 valid blocks, and the 11 valid blocks indicated by the reverse directory 204 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 210 may be formed as a data structure in memory of GCUs that have been found to require further evaluation. In this way, the GCUs can be evaluated later at an appropriate time for resolution, after which the corrected GCUs can be placed on the verified list in the TOVG 208.

It will be noted that the foregoing operation of the control circuit 206 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the management circuit 200 having a garbage collection scheduler circuit 212. This circuit 212 generally operates once it is appropriate to consider performing a garbage collection operation, at which point the circuit 212 selects from among the available verified GCUs from the table 208. In some cases, the circuit 212 may generate a time of completion estimate to complete the garbage collection operation based on the size of the GCU, the amount of data to be relocated, etc.

As will be appreciated, a garbage collection operation can include accessing the forward map and/or reverse directory 202, 204 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
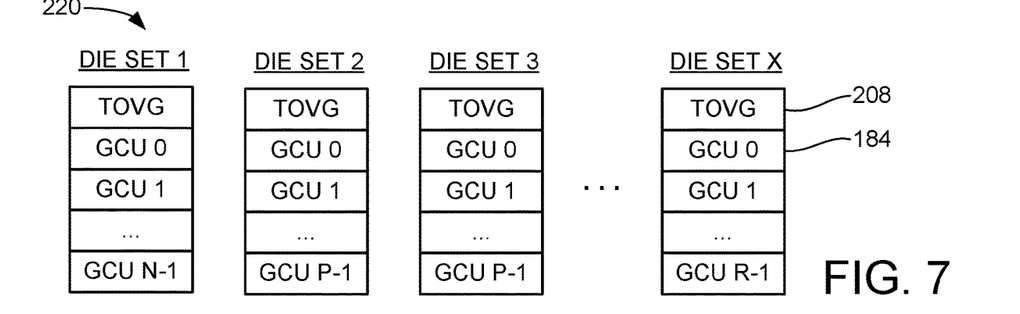
FIG. 7 conveys portions of an example data storage system arranged in accordance with assorted embodiments.

FIG. 7 shows a number of die sets 220 that may be arranged across the SSD 140 in some embodiments. Each set 220 may have the same nominal data storage capacity (e.g., the same number of allocated dies, etc.), or each may have a different storage capacity. The storage capacity of each die set 220 is arranged into a number of GCUs 184 as shown. In addition, a separate TOVG (table of verified GCUs) 208 may be maintained by and in each die set 200 to show the status of the respective GCUs. From this, each time that it becomes desirable to schedule a garbage collection operation, such as to free up new available memory for a given set, the table 208 can be consulted to select a GCU that, with a high degree of probability, can be subjected to an efficient garbage collection operation without any unexpected delays due to mismatches in the metadata (forward map and reverse directory).

Figure 8:
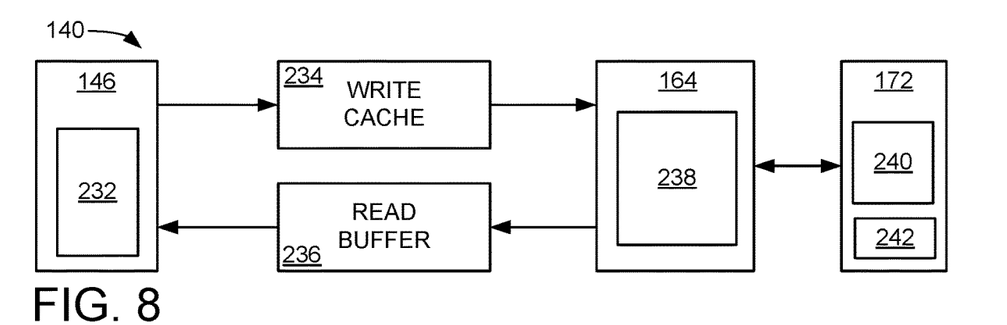
FIG. 8 illustrates portions of an example data storage system that may be employed in accordance with various embodiments.

FIG. 8 shows a functional block representation of additional aspects of the SSD 140. The core CPU 146 from FIG. 3 is shown in conjunction with a code management engine (CME) 232 that can be used to manage the generation of the respective code words and outer code parity values for both standard and non-standard parity data sets. During write operations, input write data from the associated host are received and processed to form MUs which are placed into a non-volatile write cache 234 which may be flash memory or other form(s) of non-volatile memory. The MUs are transferred to the DMM circuit 164 for writing to the flash memory 152 in the form of code words. During read operations, one or more pages of data are retrieved to a volatile read buffer 236 for processing prior to transfer to the host.

The CME 232 determines the appropriate inner and outer code rates for the data generated and stored to memory. In some embodiments, the DMM circuit 164 may generate both the inner and outer codes. In other embodiments, the DMM circuit 164 generates the inner codes (see e.g., LDPC circuit 170 in FIG. 3) and the core CPU 146 generates the outer code words. In still other embodiments, the same processor/controller circuit generates both forms of code words. Other arrangements can be used as well. The CME 232 establishes appropriate code rates for both types of code words.

During generation of the outer codes, a parity buffer 238 may be used to successively XOR each payload being written during each pass through the dies. Both payload data 240 and map data 242 will be stored to flash 172. The execution of data access requests to store data to, or read data from, one or more flash memories 172 of one or more data storage devices 104 can be facilitated with multiple queues arranged in accordance with the NVMe standard.

Figure 9:
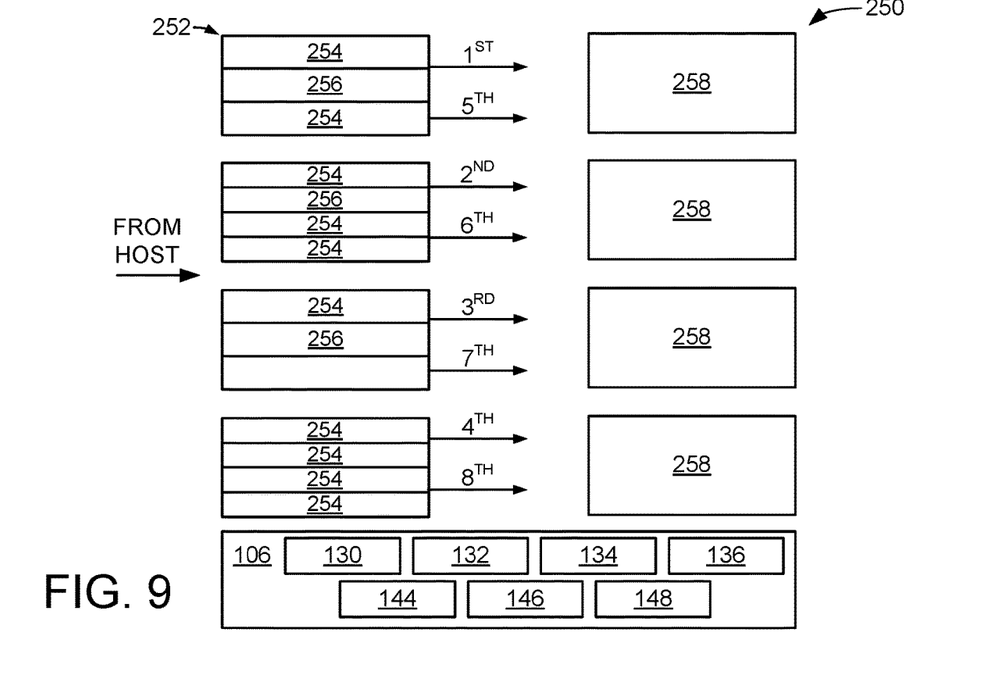
FIG. 9 is a block representation of portions of an example data storage system in which various embodiments may be practiced.

FIG. 9 conveys a block representation of portions of an example data storage system 250 in which data request queues 252 are employed in accordance with various embodiments. It is initially noted that the various data request queues 252 can store a request 254, and data block 256 associated with the stored requests 254, can be located in a data storage device 104 and/or a network device, such as device 106 that has a network controller 130 and memory 132. The ability to create and utilize data request queues 252 at the network 106 and/or local data storage device 104 level allows for a diverse range of request 254, and request data 256, queuing capabilities and configurations that can be catered to the data storage arrangement and data request history to optimize operations to achieve desired data access performance.

One such data storage queuing arrangement has the respective data requests 254, and/or data 256, assigned a destination address in at least one data set 258 of a non-volatile memory 126 while being temporarily stored in the queues 252 of one or more network buffers 132. The network buffer(s) 132 can be connected to a network controller 130 that can selectively employ arbitration 134 and/or prediction 136 circuitry for any stored request 254 and/or request data 256.

The network controller 130 alone, or in cooperation with one or more local memory controllers 128, can select an order of data request 254 execution with the arbitration circuitry 134 that corresponds with a round robin sequence. As shown by numbered arrows from the respective queues 252, the arbitration circuitry 134 can consecutively, and cyclically, execute a data request 254 stored in a different queue 252. Accordingly, each queue 252 has a pending request 254 executed to store data to, or retrieve data from, a selected data set 258 prior to repeating the execution of a request 252 from a single queue 252.

Figure 10:
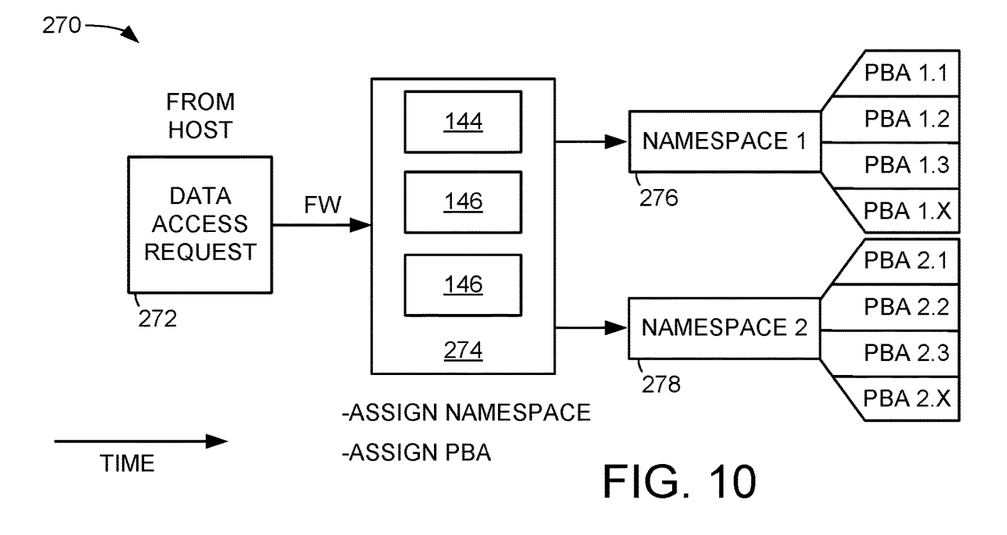
FIG. 10 represents portions of an example data storage system configured in accordance with various embodiments.

Through the round robin arbitration of pending data requests 254, the size of data 256 being transferred and the time involved with execution of the requests 254 can vary to a relatively high degree, which results in inconsistent system 250 resource utilization and data request execution. FIG. 10 illustrates portions of an example data storage system 270 that can be utilized to provide auto-routing of data access requests/commands in accordance with various embodiments, regardless of the arbitration process being utilized by the various queues 252. That is, the auto-routing of data access commands 272 is agnostic with regard to queue arbitration and, as such, can optimize system 270 operation in a variety of different queue selection and data arbitration configurations.

As shown in FIG. 10, one or more data access requests 272, such as a write, read, update, refresh, or poll of data destined for, or resident in, at least one data storage device. A data access request 272 is guided by firmware (FW) of the system 270 to a system module 274 where at least two controllers 144/146/148 are available to assign a namespace and a constituent physical block address (PBA) for the data access request. For a data read request 272, the system module 274 will assign the request 272 the namespace 276/278 and PBA where the requested data is stored. For a data write request 272, the system module 274 will assign the data to be written a namespace 276/278 and a particular PBA.

While utilizing multiple controllers 144/146/148 with the system module 274 can service a plurality of data access requests 272 efficiently, above a certain volume of pending data access requests 272 will result in the controllers 144/146/148 being overwhelmed and incapable of maintaining request servicing performance. That is, the controllers 144/146/148 can only handle so much request traffic and adding more controllers can be cost, power, and size prohibitive. Hence, request auto-routing embodiments are directed to utilizing the firmware of the system to assign a request a namespace based on a predetermined assignment protocol of the firmware.

Figure 11:
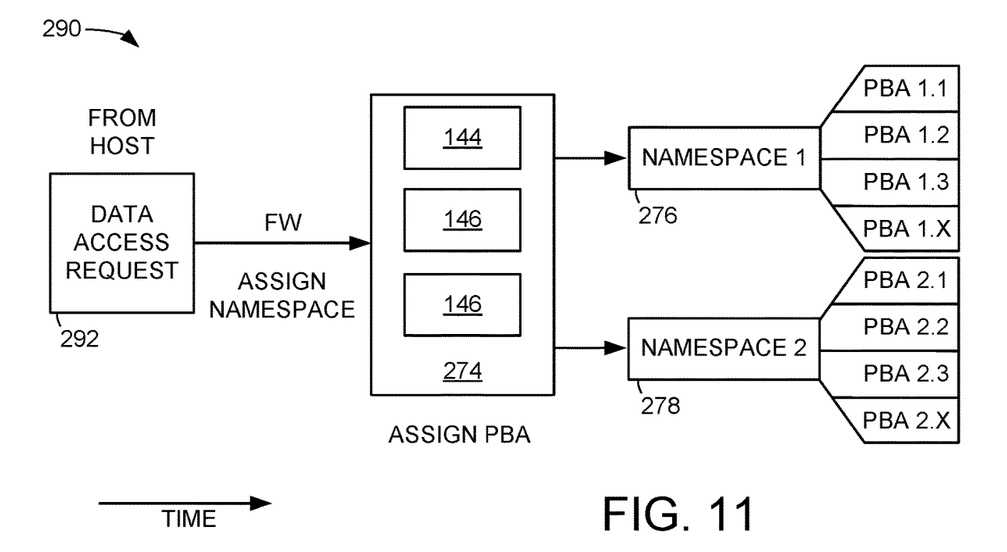
FIG. 11 displays portions of an example data storage system that can be utilized by assorted embodiments.

FIG. 11 depicts a block representation of portions of an example data storage system 290 in which assorted embodiments can be practiced. Once a data access request 292 is received, firmware resident upstream of the system module 274 assigns a namespace 276/278 prior to arrival at the system module 274. With the namespace assigned to a request, the system module 274 can efficiently assign the optimal PBA for the data, the current system 290 conditions, and any forecasted system 290 conditions. The separation of namespace and PBA assignment allows the system module 274 to maintain optimal request servicing performance when faced with large pending request volumes.

It is noted that the assignment of a namespace prior to the system module 274 can be characterized as auto-routing of the data and data access request from a host. As a result of such auto-routing, the system module 274 enjoys a reduced workload for a volume of requests 292 compared to the system 270 where the system module 274 assigns both namespace and PBA to service requests 272.

Figure 12:
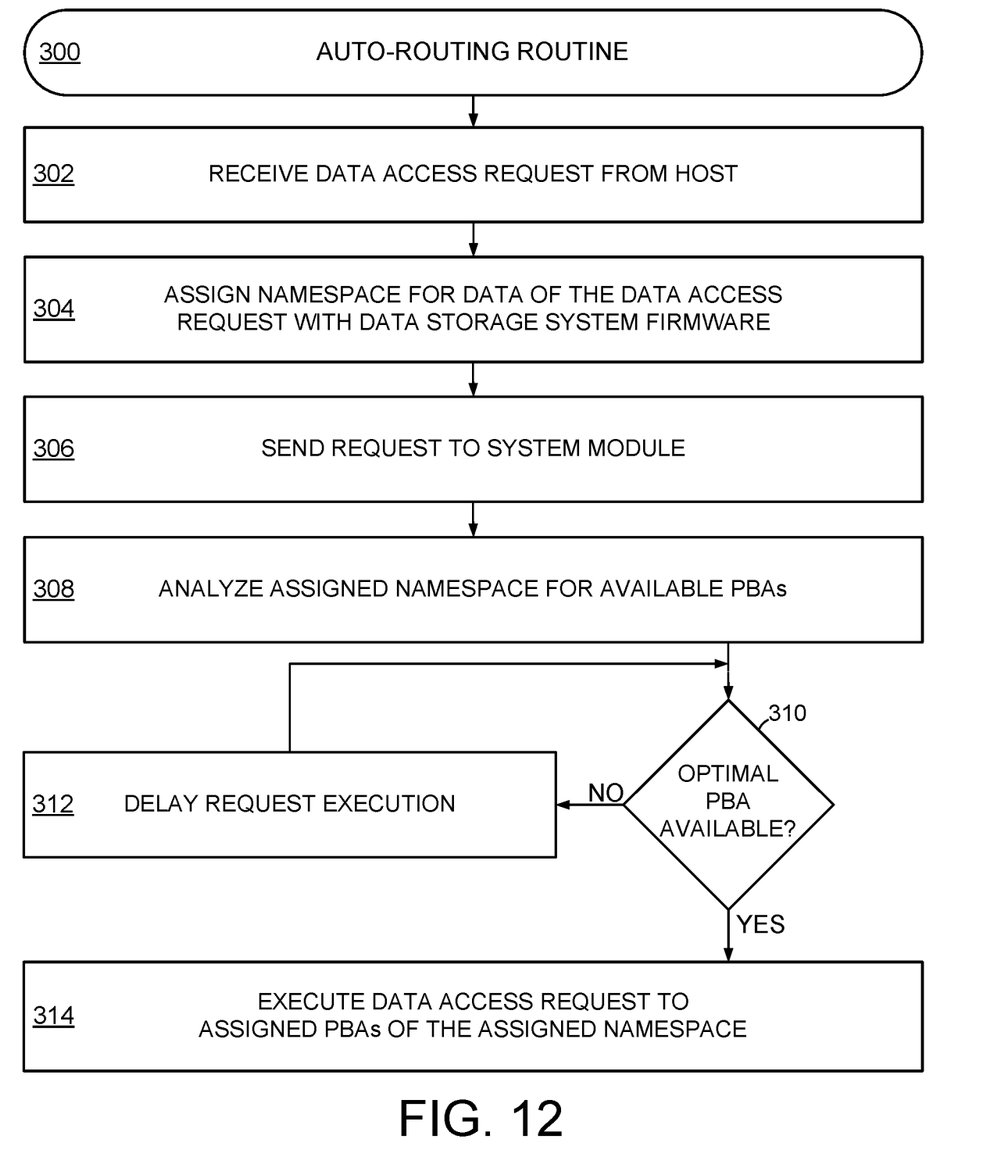
FIG. 12 is an example auto-routing routine that can be executed by the respective embodiments of FIGS. 1-11.

The data storage system 290 can be employed to conduct the auto-routing routine 300 shown in FIG. 12. The routine 300 can begin with receipt of at least one data access request from a host in step 302. It is contemplated that multiple different data access requests can be received in step 302 from any number of hosts that are logically and physically separated from any of the data storage devices of the data storage system. The data access request is then assigned a namespace by the firmware of the data storage system in step 304. The firmware may be resident in the host, in an upstream controller from the system module, or in a network node upstream from the system module.

The assignment of the namespace allows step 306 to pass the data access request to the system module where the module proceeds to analyze the assigned namespace for available PBAs in step 308. The system module may poll the memory itself, a data map, or a data lookup table to identify the PBAs that may be used for new data. The analysis of step 308 may identify vacant PBAs, PBAs with expired data, PBAs that have experienced errors, and PBAs that have been previously unavailable as available for new data associated with the newly assigned data access requests. Step 308 may additionally involve evaluating available PBAs to determine which PBAs provide optimal data storage performance, such as data read latency, error rate, or power consumption.

It is noted that step 308 can execute one or more test reads and/or writes to various PBAs of a namespace to determine the optimal data storage performance capabilities. Decision 310 evaluates if the PBAs identified as available in step 308 coincide with the data storage locations that provide optimal data storage performance, such as error rate, read latency, or write speed. If the optimal PBAs are not currently available, step 312 delays execution of the data access request and returns to decision 310.

Once the PBAs identified with optimal performance are available, step 314 services the pending data access request to the PBAs of the assigned namespace. The assignment of the namespace upstream of the system module allows the controllers of the system module to conduct the intelligent identification and utilization of the optimal PBAs of a namespace instead of evaluating and assigning namespaces. As such, the auto-routing of data access requests based on firmware assignment and not system module controllers used to direct the servicing of data access requests can increase data access request execution efficiency, particularly when numerous data access requests are concurrently pending from assorted different hosts as part of a distributed data storage system.

What is claimed is:

1. A method comprising:
connecting a host to a data storage device via a system module;
generating a data access request with the host;
assigning a namespace to the data access request with a firmware upstream of the system module;
testing at least one address of the assigned namespace with a write operation and read operation, as directed by the system module, to determine data storage performance capabilities; and
assigning the an optimal physical data address in the assigned namespace of the data storage device with the system module in response to the tested data storage performance capabilities.

2. The method of claim 1, wherein the system module tests each physical data addresses of the assigned namespace prior to assigning the optimal physical data address.

3. The method of claim 1, wherein the firmware assigns the namespace autonomously.

4. The method of claim 1, wherein the firmware assigns the namespace based on a predetermined assignment protocol.

5. The method of claim 1, wherein the optimal physical data address corresponds with a location having a greatest data storage performance of all physical data addresses of the namespace in the data storage device.

6. The method of claim 5, wherein the greatest data storage performance corresponds with a lowest error rate.

7. The method of claim 5, wherein the greatest data storage performance corresponds with a fastest read latency.

8. The method of claim 5, wherein the greatest data storage performance is tested by the system module by writing at least one physical data address multiple times.

9. The method of claim 5, wherein the greatest data storage performance is polled by the system module by monitoring activity of the data storage device.

10. The method of claim 1, wherein the assigned namespace is retained by the system module throughout the assignment of the optimal physical data address.

11. A method comprising:
connecting a host to a data storage device via a system module;
generating a data write request with the host;
assigning a namespace to the data write request with a firmware upstream of the system module;
determining an availability of physical data addresses of the assigned namespace in the data storage device;
testing at least one address of the assigned namespace with a write operation and read operation, as directed by the system module, to determine data storage power consumption;
assigning an optimal physical data address in the assigned namespace in the data storage device with the system module in response to the tested data storage power consumption; and
writing data associated with the data write request to the assigned physical data address of the assigned namespace.

12. The method of claim 11, wherein the firmware is present in the host.

13. The method of claim 11, wherein the firmware is present in a network node.

14. The method of claim 11, wherein the system module delays writing data associated with the data write request in response to the assigned optimal physical data address not being available.

15. The method of claim 11, wherein the namespace spans multiple different data storage devices.

16. The method of claim 11, wherein data associated with the data write request occupies less than all of the available physical data addresses of the namespace.

17. The method of claim 11, wherein at least one physical data address of the namespace in the data storage device is determined to be unavailable by the system module.

18. The method of claim 11, wherein the system module concurrently determines available physical data addresses and assigns the optimal physical data address.

19. An system comprising a host connected to a data storage device via a system module, the system module configured to assign an optimal physical data address in the data storage device corresponding to a namespace assigned to a data access request by firmware upstream of the system module, the optimal physical data address corresponding with a data storage performance capability tested by the system module by writing and reading data to the assigned namespace.

20. The system of claim 19, wherein the system module comprises a first controller to detect available physical data addresses in the namespace of the data storage device and a second controller to determine the optimal physical data address of the namespace of the data storage device.

* * * * *